(12) United States Patent
Jacques

(10) Patent No.: US 8,449,271 B2
(45) Date of Patent: May 28, 2013

(54) ENGINE ASSEMBLY INCLUDING CAMSHAFT WITH INTEGRATED PUMP

(75) Inventor: Robert Lionel Jacques, Troy, MI (US)

(73) Assignee: GM Global Technology Operations LLC

(*) Notice: Subject to any disclaimer, the term of this patent is extended or adjusted under 35 U.S.C. 154(b) by 482 days.

(21) Appl. No.: 12/874,436

(22) Filed: Sep. 2, 2010

(65) Prior Publication Data

US 2011/0280745 A1 Nov. 17, 2011

Related U.S. Application Data

(60) Provisional application No. 61/345,386, filed on May 17, 2010.

(51) Int. Cl.
*F04B 35/00* (2006.01)

(52) U.S. Cl.
USPC .......................................................... 417/364

(58) Field of Classification Search
USPC ................ 417/364; 123/198 C, 508; 74/567, 74/595, 596, 605
See application file for complete search history.

(56) References Cited

U.S. PATENT DOCUMENTS

| | | | | |
|---|---|---|---|---|
| 4,156,416 A | * | 5/1979 | Weisgerber et al. | 123/196 R |
| 4,458,641 A | * | 7/1984 | Wickramasuriya | 123/195 A |
| 4,497,618 A | * | 2/1985 | Anderson et al. | 418/212 |
| 4,662,320 A | * | 5/1987 | Moriya | 123/41.44 |
| 5,674,059 A | * | 10/1997 | Bucur | 418/28 |
| 5,839,346 A | * | 11/1998 | Sekiya et al. | 92/5 R |
| 5,839,887 A | * | 11/1998 | Duret | 417/364 |
| 5,842,451 A | * | 12/1998 | von Eisebeck et al. | 123/196 R |
| 5,899,181 A | * | 5/1999 | Kurata et al. | 123/90.17 |
| 6,148,787 A | * | 11/2000 | Takano | 123/195 A |
| 6,345,595 B2 | * | 2/2002 | Yamada | 123/90.15 |
| 6,345,600 B1 | * | 2/2002 | Schneider | 123/198 C |
| 6,523,518 B2 | * | 2/2003 | Kunde et al. | 123/193.5 |
| 6,945,759 B2 | * | 9/2005 | Henderson | 417/410.3 |
| 7,628,142 B2 | * | 12/2009 | Hayman et al. | 123/509 |
| 7,665,435 B2 | * | 2/2010 | Imazato et al. | 123/90.27 |
| 2005/0274345 A1 | * | 12/2005 | Dietz | 123/90.17 |
| 2007/0059187 A1 | * | 3/2007 | Lo Biundo et al. | 417/364 |
| 2007/0240671 A1 | * | 10/2007 | Imazato et al. | 123/193.5 |
| 2008/0047390 A1 | * | 2/2008 | Kohrs et al. | 74/568 R |
| 2008/0196522 A1 | * | 8/2008 | Eberhardt et al. | 74/63 |
| 2008/0240962 A1 | * | 10/2008 | Ono et al. | 418/83 |
| 2008/0283010 A1 | * | 11/2008 | Bohner et al. | 123/90.17 |
| 2010/0239440 A1 | * | 9/2010 | Heaps et al. | 417/364 |

* cited by examiner

*Primary Examiner* — Charles Freay
*Assistant Examiner* — Alexander Comley
(74) *Attorney, Agent, or Firm* — Harness, Dickey & Pierce, P.L.C.

(57) ABSTRACT

A camshaft assembly may include a shaft and a mechanical vacuum pump. The shaft may define first and second ends and include first and second lobes and first and second bearing support structures distributed between the first and second end. The shaft may define a first vane opening. The mechanical pump may be coupled to the shaft between the first and second ends. The mechanical vacuum pump may include a cover, a housing coupled to the cover to define a cavity therebetween and a vane. The cover may define a cover opening that rotatably receives the shaft. The housing may define a housing opening that rotatably receives the shaft. The vane may be arranged within the cavity and slidably received within the first vane opening such that the vane rotates with the shaft.

20 Claims, 4 Drawing Sheets

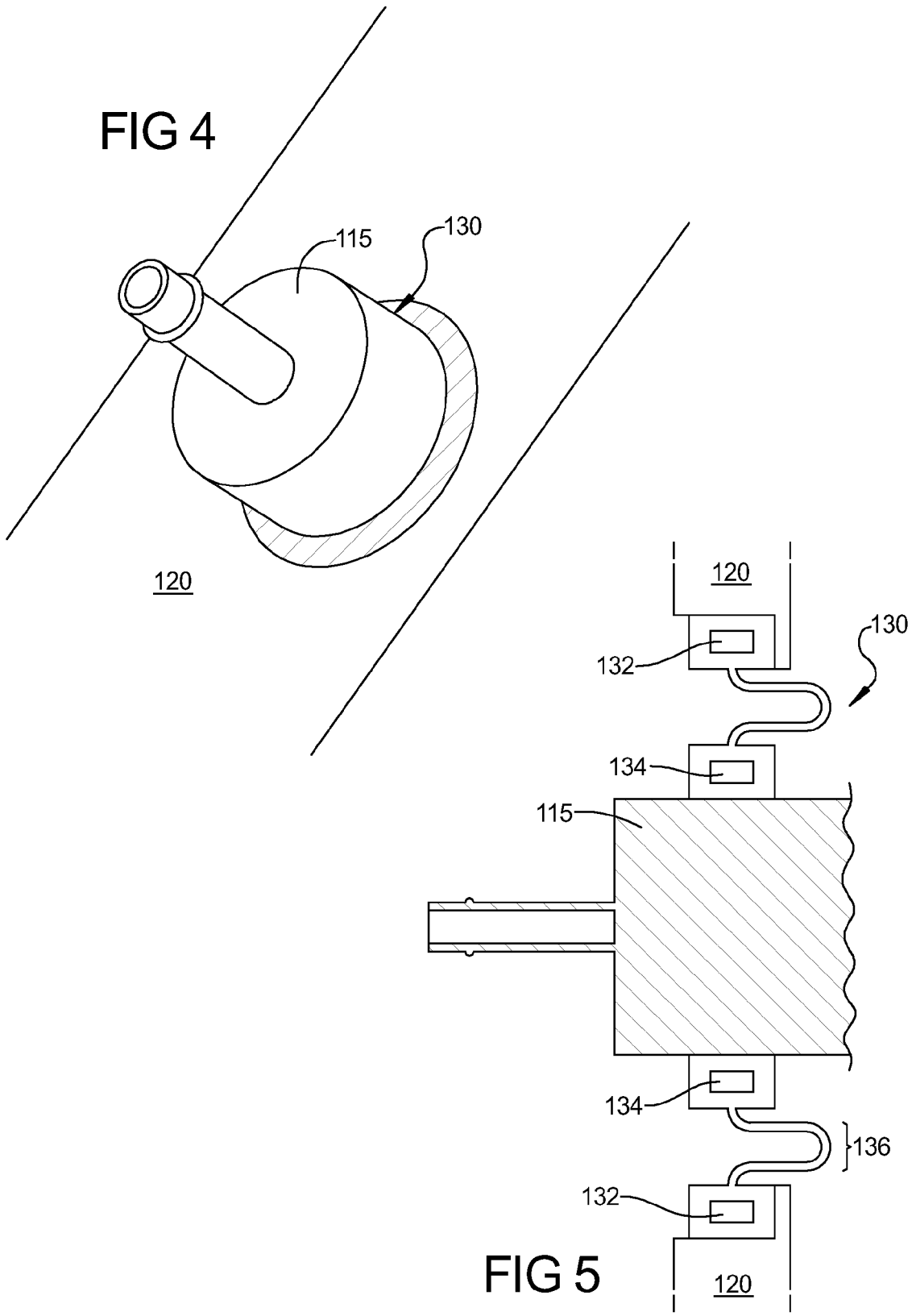

ENGINE ASSEMBLY INCLUDING CAMSHAFT WITH INTEGRATED PUMP

CROSS-REFERENCE TO RELATED APPLICATIONS

This application claims the benefit of U.S. Provisional Application No. 61/345,386, filed on May 17, 2010. The entire disclosure of the above application is incorporated herein by reference.

FIELD

The present disclosure relates to engine camshafts, and more specifically to a camshaft assembly that includes an integrated mechanical vacuum pump.

BACKGROUND

This section provides background information related to the present disclosure which is not necessarily prior art.

An engine camshaft assembly may include a plurality of lobes and bearing regions. During operation of the engine, the camshaft assembly is rotated and the lobes act to open the intake and/or exhaust valves of the engine. The bearing regions provide a bearing surface for the support of the camshaft assembly. One end of the camshaft assembly may be connected to a mechanical vacuum pump, which may be used to power various vehicle systems, such as a vehicle braking system. An assembled camshaft assembly and mechanical vacuum pump may increase the size and complexity of the engine assembly.

SUMMARY

This section provides a general summary of the disclosure, and is not a comprehensive disclosure of its full scope or all of its features.

A camshaft assembly may include a shaft and a mechanical vacuum pump. The shaft may define first and second ends and include first and second lobes and first and second bearing support structures distributed between the first and second end. The shaft may define a first vane opening. The mechanical pump may be coupled to the shaft between the first and second ends. The mechanical vacuum pump may include a cover, a housing coupled to the cover to define a cavity therebetween and a vane. The cover may define a cover opening that rotatably receives the shaft. The housing may define a housing opening that rotatably receives the shaft. The vane may be arranged within the cavity and slidably received within the first vane opening such that the vane rotates with the shaft.

An engine assembly may include an engine structure and a camshaft assembly rotationally supported by the engine structure. The camshaft assembly may include a shaft and a mechanical vacuum pump. The shaft may define first and second ends and include first and second lobes and first and second bearing support structures distributed between the first and second end. The shaft may define a first vane opening. The mechanical pump may be coupled to the shaft between the first and second ends. The mechanical vacuum pump may include a cover, a housing coupled to the cover to define a cavity therebetween and a vane. The cover may define a cover opening that rotatably receives the shaft. The housing may define a housing opening that rotatably receives the shaft. The vane may be arranged within the cavity and slidably received within the first vane opening such that the vane rotates with the shaft.

A camshaft assembly may include a shaft and a mechanical vacuum pump. The shaft may extend from a first end to a second end. The shaft may define first and second ends and include first and second lobes and first and second bearing support structures distributed between the first and second end. The shaft may define a first vane opening. The mechanical pump may be coupled to the shaft between the first and second bearing support structures of the plurality of bearing support structures. The mechanical vacuum pump may include a cover, a housing coupled to the cover to define a cavity therebetween, a vane slide and a vane. The cover may define a cover opening that rotatably receives the shaft. The housing may define a housing opening that rotatably receives the shaft. The vane slide may be secured to the shaft such that the vane slide rotates with the shaft. The vane slide may define a second vane opening and include a first end pilot that is rotatably received within the cover opening and a second end pilot that is rotatably received within the housing opening. The vane may be arranged within the cavity and slidably received within the first vane opening such that the vane rotates with the shaft.

Further areas of applicability will become apparent from the description provided herein. The description and specific examples in this summary are intended for purposes of illustration only and are not intended to limit the scope of the present disclosure.

BRIEF DESCRIPTION OF THE DRAWINGS

The drawings described herein are for illustrative purposes only and are not intended to limit the scope of the present disclosure in any way.

FIG. 4 is a partial perspective view of the engine assembly of FIG. 1; and

FIG. 5 is a partial sectional view of the engine assembly of FIG. 1.

Corresponding reference numerals indicate corresponding parts throughout the several views of the drawings.

DETAILED DESCRIPTION

Examples of the present disclosure will now be described more fully with reference to the accompanying drawings. The following description is merely exemplary in nature and is not intended to limit the present disclosure, application, or uses.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

When an element or layer is referred to as being "on," "engaged to," "connected to" or "coupled to" another element or layer, it may be directly on, engaged, connected or coupled to the other element or layer, or intervening elements or layers may be present. In contrast, when an element is referred to as being "directly on," "directly engaged to," "directly connected to" or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Figure 1:
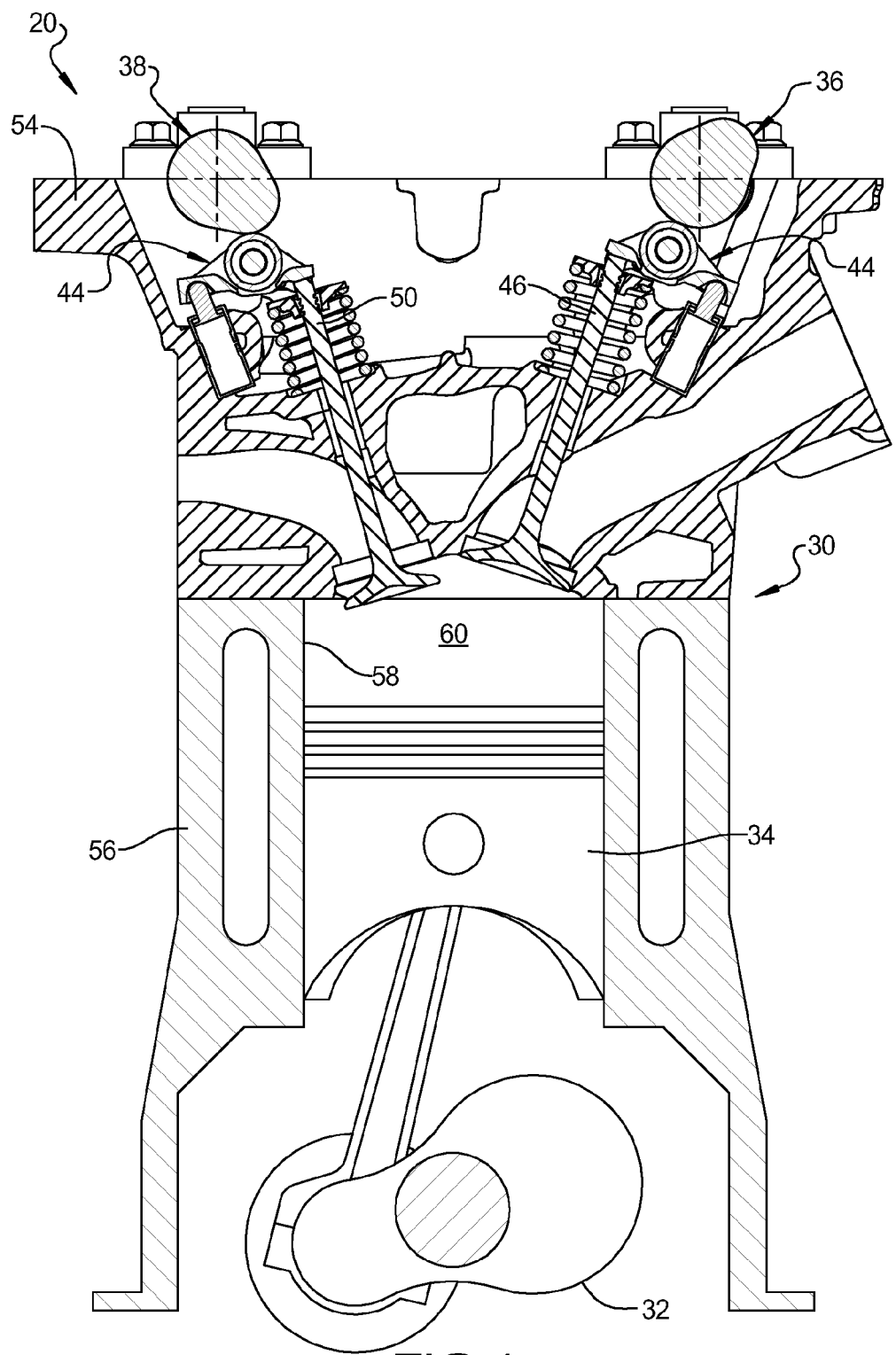
FIG. 1 is a schematic section view of an engine assembly including an exemplary camshaft assembly according to the present disclosure.

With reference to FIG. 1, an engine assembly 20 may include an engine structure 30, a crankshaft 32 rotationally supported by the engine structure 30, one or more pistons 34 coupled to the crankshaft 32, intake and exhaust camshaft assemblies 36, 38 rotationally supported on the engine structure 30, valve lift assemblies 44, at least one intake valve 46, and at least one exhaust valve 50. One or both of the camshaft assemblies 36, 38 may have the structure of camshaft assembly 100 described below. The engine structure 30 may include an engine block 56 and a cylinder head 54. The engine block 56 may define cylinder bores 58. The cylinder head 54 and the cylinder bores 58 in the engine block 56 may cooperate to define combustion chambers 60. In the present non-limiting example, the engine assembly 20 is shown as a dual overhead camshaft engine with the engine structure 30 having the cylinder head 54 rotationally supporting the intake and exhaust camshaft assemblies 36, 38. It is understood, however, that the present disclosure is not limited to overhead camshaft configurations.

Figure 2:
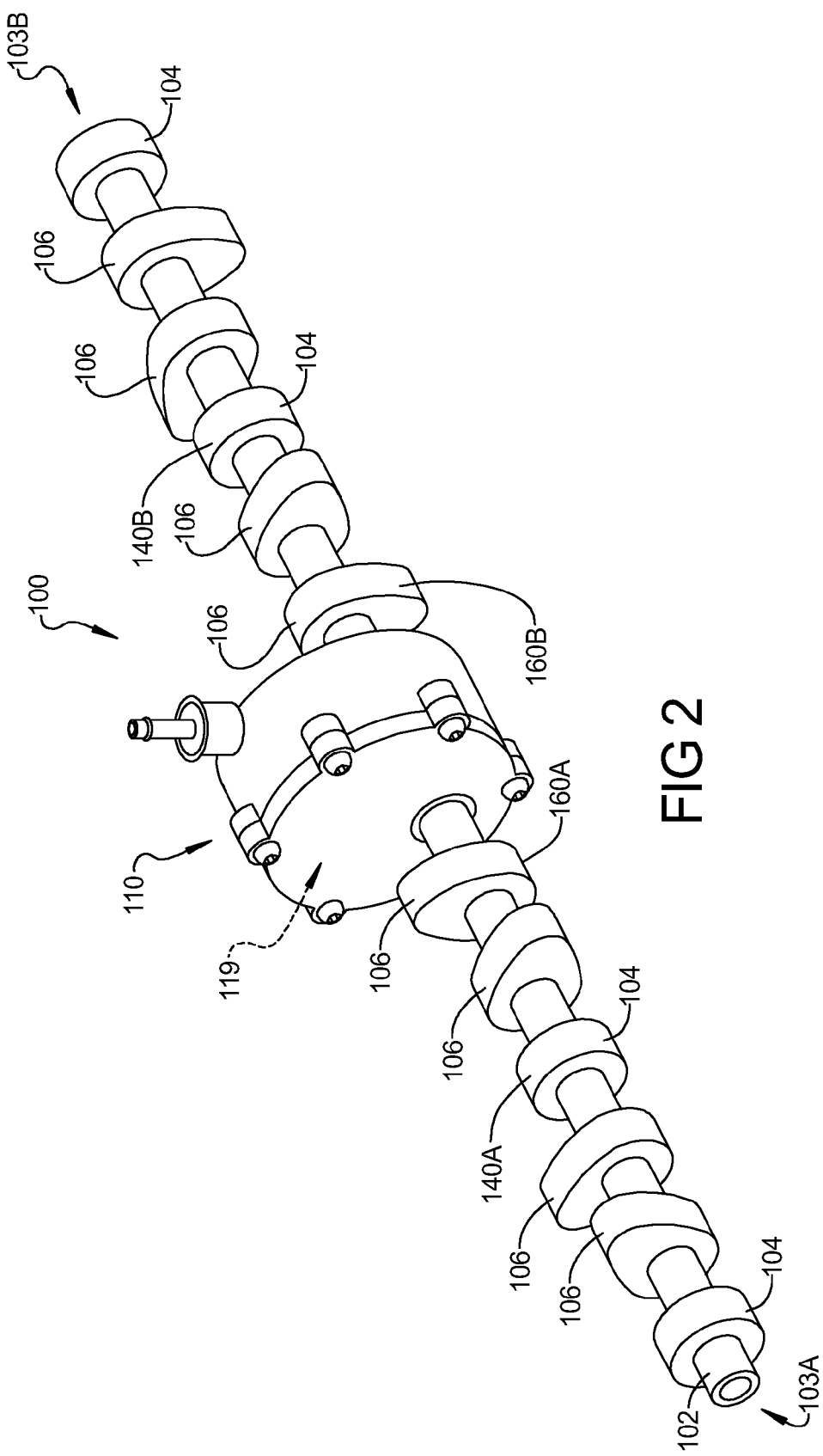
FIG. 2 is a schematic perspective view of an exemplary camshaft assembly according to the present disclosure.
Figure 3:
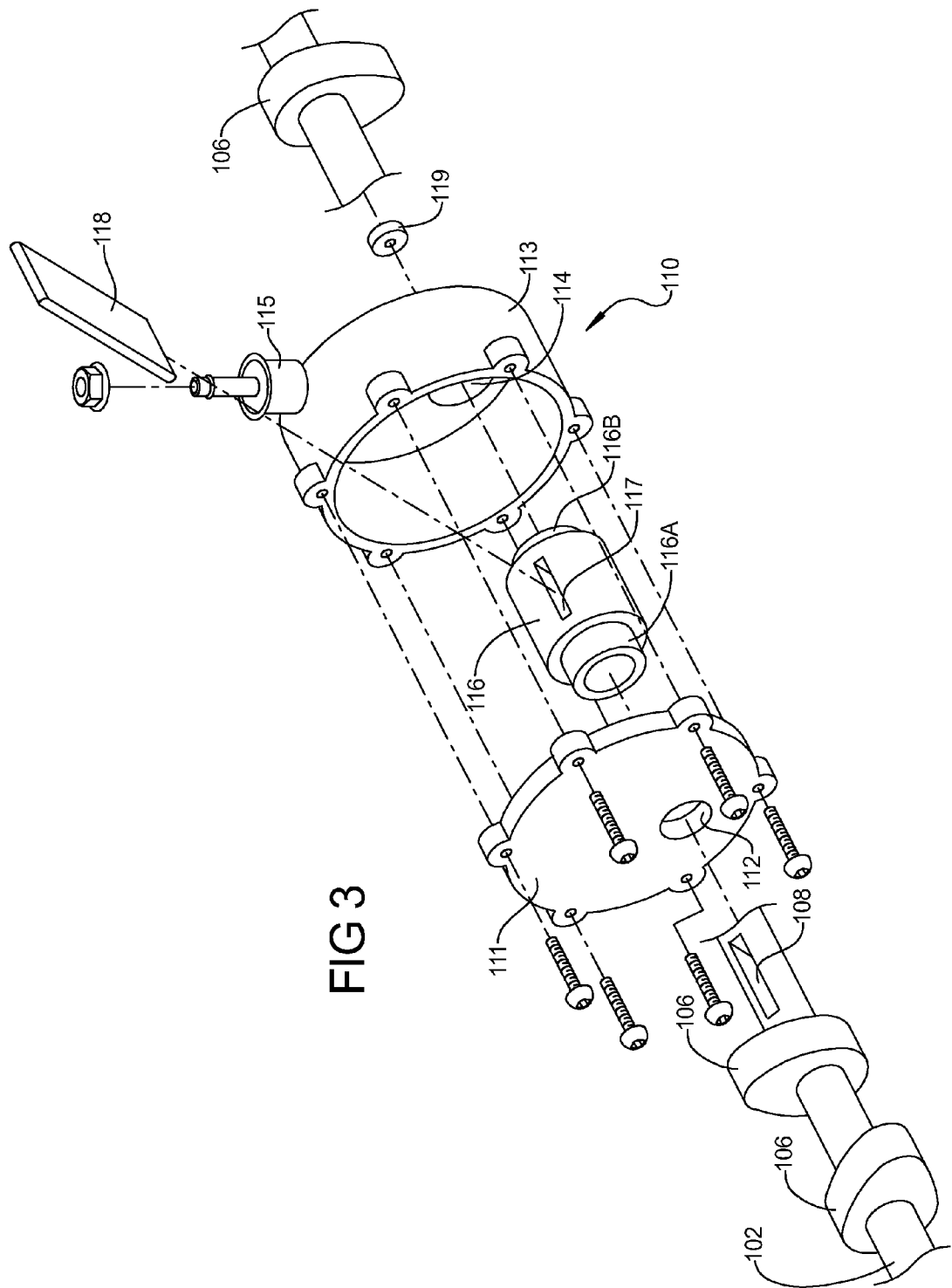
FIG. 3 is a schematic exploded perspective view of a portion of the camshaft assembly of FIG. 2.

An exemplary camshaft assembly 100 according to the present disclosure is illustrated in FIGS. 2-3. The camshaft assembly 100 may include a shaft 102 that extends from a first end 103A to a second end 103B. The shaft 102 may be a hollow, tube-like structure and include a plurality of bearing support structures 104 and lobes 106 distributed along the shaft 102 between the first and second ends 103A, 103B. The shaft 102 may define a first vane opening 108 arranged between the first and second ends 103A, 103B. The bearing support structures 104 provide the bearing surface for the support of the camshaft assembly 100 within the engine structure 30, e.g., cylinder head 54. As the camshaft assembly 100 is rotated, the lobes 106 act to open the intake and/or exhaust valves 46, 50.

Camshaft assembly 100 may further include a mechanical vacuum pump 110 coupled to the shaft 102. The mechanical vacuum pump 110 may be arranged between the first and second ends 103A, 103B. In one non-limiting example, the mechanical vacuum pump 110 may be arranged between a first and second bearing support structure 140A, 140B of the plurality of bearing support structures 104. Further, the mechanical vacuum pump 110 may be arranged between a first and second lobe 160A, 160B of the plurality of lobes 106. The mechanical vacuum pump 110 may have an oblong or elliptical shape and include a cover 111 coupled to a housing 113 to define a cavity 119 therein. The cover 111 may define a cover opening 112 for rotatably receiving the shaft 102. Similarly, the housing 113 may define a housing opening 114 for rotatably receiving the shaft 102. A seal may be present in each of the cover and housing openings 112, 114 and/or the cover and housing openings 112, 114 may be sized to be sealingly engaged with the shaft 102 (or end pilots 116A, B discussed below). The housing 113 may include an outlet 115 for coupling the various vehicle systems to be powered with the mechanical vacuum pump 110.

A vane slide 116 may be arranged between the cover 111 and housing 113 and define a second vane opening 117. The vane slide 116 may be secured to the shaft 102 such that the vane slide 116 and shaft 102 rotate together. By way of non-limiting example, the vane slide 116 may be press fit to the shaft 102. Further, the vane slide 116 may be secured to the shaft 102 such that the first and second vane openings 108, 117 are aligned. In a non-limiting example, the vane slide 116 may include first and second end pilots 116A, B. The first and second end pilots 116A, B may be sized such that they are rotatably received within the cover opening 112 and housing opening 114, respectively. In this manner, the end pilots 116A, B may provide the radial location for the mechanical vacuum pump 110.

A vane 118 may be arranged within the cavity 119 defined by the cover 111 and housing 113 and slidably engaged with the first and second vane openings 108, 117. The vane 118 may be slidably received, and therefore free to slide, within the first and second vane openings 108, 117 as the shaft 102 and vane slide 116 rotate. In this manner, the vane 118 slides and rotates within the chamber defined by the cover 111 and housing 113 to create a vacuum within the mechanical vacuum pump 110. Additionally, an oiling structure 119 may be arranged within the shaft 102 to control oil flow to the mechanical vacuum pump 110. For example only, the oiling structure 119 may be a ring-like structure that defines an orifice for limiting the oil provided to the mechanical vacuum pump 110 through the hollow shaft 102.

Referring now to FIGS. 4-5, the outlet 115 of the mechanical vacuum pump 110 may be utilized to attach and seal to a cam cover 120 attached to the engine structure 30. In this manner, the outlet 115 may provide torque reaction for the mechanical vacuum pump 110. In order to compensate for movement and/or misalignment, a bellows seal 130 may be utilized to seal the junction between the outlet 115 and cam cover 120. The bellows seal 130 may include a first ring 132 and a second ring 134 arranged within the first ring 132. The first and second rings 132, 134 may be made of a resilient material (such as, steel or other metal) and be encased with a flexible, elastic material (such as, rubber). A bellows portion 136 may be arranged between the first and second rings 132, 134. The bellows portion 136 may allow for relative movement between the first and second rings 132, 134 while maintaining a sealing connection between bellows seal 130 and outlet 115.

What is claimed is:
1. A camshaft assembly comprising:
a shaft defining first and second ends and including first and second lobes and first and second bearing support structures distributed between the first and second end, the shaft defining a first vane opening; and
a mechanical vacuum pump coupled to the shaft at a location between the first and second ends and including:

a cover that defines a cover opening that rotatably receives the shaft;

a housing coupled to the cover to define a cavity therebetween, the housing defining a housing opening that rotatably receives the shaft; and a vane arranged within the cavity and slidably received within the first vane opening such that the vane rotates with the shaft.

2. The camshaft assembly of claim 1, wherein the mechanical vacuum pump is arranged between the first and second lobes.

3. The camshaft assembly of claim 1, wherein the mechanical vacuum pump is arranged between the first and second bearing support structures.

4. The camshaft assembly of claim 1, wherein the mechanical vacuum pump includes a vane slide defining a second vane opening, the vane being slidably received within the second vane opening and the vane slide being secured to the shaft such that the vane slide rotates with the shaft.

5. The camshaft assembly of claim 4, wherein the vane slide includes a first end pilot that is rotatably received within the cover opening and a second end pilot that is rotatably received within the housing opening.

6. The camshaft assembly of claim 5, wherein the cover opening is sealingly engaged with the first end pilot and the housing opening is sealingly engaged with the second end pilot.

7. The camshaft assembly of claim 5, wherein the vane slide is press fit to the shaft.

8. The camshaft assembly of claim 1, wherein the cover opening and the housing opening are sealingly engaged with the shaft.

9. The camshaft assembly of claim 1, further comprising an oiling structure arranged within the shaft that controls oil flow to the mechanical vacuum pump.

10. The camshaft assembly of claim 9, wherein the oiling structure has a ring-like structure that defines an aperture.

11. An engine assembly comprising:

an engine structure; and a camshaft assembly rotationally supported by the engine structure and including:

a shaft defining first and second ends and including first and second lobes and first and second bearing support structures distributed between the first and second end, the shaft defining a first vane opening; and a mechanical vacuum pump coupled to the shaft at a location between the first and second ends, the mechanical vacuum pump including a cover that defines a cover opening that rotatably receives the shaft, a housing coupled to the cover to define a cavity therebetween, the housing defining a housing opening that rotatably receives the shaft, and a vane arranged within the cavity and slidably received within the first vane opening such that the vane rotates with the shaft.

12. The engine assembly of claim 11, wherein the mechanical vacuum pump is arranged between the first and second lobes.

13. The engine assembly of claim 11, wherein the mechanical vacuum pump is arranged between the first and second bearing support structures.

14. The engine assembly of claim 11, wherein the mechanical vacuum pump includes a vane slide defining a second vane opening, the vane being slidably received within the second vane opening and the vane slide being secured to the shaft such that the vane slide rotates with the shaft.

15. The engine assembly of claim 14, wherein the vane slide includes a first end pilot that is rotatably received within the cover opening and a second end pilot that is rotatably received within the housing opening.

16. The engine assembly of claim 15, wherein the cover opening is sealingly engaged with the first end pilot and the housing opening is sealingly engaged with the second end pilot.

17. The engine assembly of claim 11, wherein the cover opening and the housing opening are sealingly engaged with the shaft.

18. The engine assembly of claim 11, further comprising a cam cover secured to the engine structure, the housing including an outlet coupled to the cam cover.

19. The engine assembly of claim 18, further comprising a bellows seal arranged between the cam cover and the outlet.

20. A camshaft assembly comprising:

a shaft defining first and second ends and including first and second lobes and first and second bearing support structures distributed between the first and second end, the shaft defining a first vane opening; and a mechanical vacuum pump coupled to the shaft at a location between first and second bearing support structures, the mechanical vacuum pump including:

a cover that defines a cover opening that rotatably receives the shaft;

a housing coupled to the cover to define a cavity therebetween, the housing defining a housing opening that rotatably receives the shaft;

a vane slide secured to the shaft such that the vane slide rotates with the shaft and defining a second vane opening, the vane slide including a first end pilot that is rotatably received within the cover opening and a second end pilot that is rotatably received within the housing opening; and a vane arranged within the cavity and slidably received within the first and second vane openings such that the vane rotates with the shaft.

* * * * *